ns Patent [19]

Lambert

[11] 3,859,426
[45] Jan. 7, 1975

[54] METHOD OF PURIFYING REFRACTORY OXIDES OF ALUMINUM AND ZIRCONIUM
[75] Inventor: Robert L. Lambert, Seneca Falls, N.Y.
[73] Assignee: GTE Sylvania Incorporated, Stamford, Conn.
[22] Filed: Jan. 17, 1972
[21] Appl. No.: 218,456

[52] U.S. Cl............... 423/592, 423/625, 23/293 R, 106/65, 423/608
[51] Int. Cl............................................. C04b 35/02
[58] Field of Search ...... 23/293, 312, 309; 423/131, 423/69, 608, 625; 204/181; 106/57, 65; 264/66

[56] References Cited
UNITED STATES PATENTS
1,175,439  3/1916  Hagedorn.......................... 23/312 R
1,926,744  9/1933  James................................ 423/131
2,438,335  3/1948  Earl..................................... 106/57
3,092,453  6/1963  Gitlen................................ 423/131
3,259,562  7/1966  Salt..................................... 204/181

Primary Examiner—Wilbur L. Bascomb, Jr.
Assistant Examiner—Hiram H. Bernstein
Attorney, Agent, or Firm—Norman J. O'Malley; Donald R. Castle; William H. McNeil

[57] ABSTRACT

Refractory oxides such as alumina and zirconia are fired in a muffle furnace at elevated temperatures (above 1,000°C), cooled to room temperature and leached with hot deionized water until a rinse shows a pH of about 7.0 to 7.5. The material is then dried and stored in a dessicator until needed. This treatment removes most contaminating salts such as sulfate and sodium compounds which are present even in electronic grade refractory oxides and allows the use of low voltage-low current deposition systems.

4 Claims, No Drawings

3,859,426

METHOD OF PURIFYING REFRACTORY OXIDES OF ALUMINUM AND ZIRCONIUM

BACKGROUND OF THE INVENTION

This invention relates to the purification of electronic grade refractory oxides such as alumina and zirconia. While the purified refractory oxides can be utilized in many applications, they are particularly appropriate for use in a low-voltage, low-current electrophoretic deposition system. Still more particularly, such oxides are ideally suited for electrophoretic deposition upon tungsten or molybdenum wire coils, such as are used as heaters in electron discharge devices, and the invention will be described with reference to this latter embodiment.

It has generally been the practice, in the manufacture of heaters for electron discharge devices, to form a thin wire coil of tungsten or molybdenum or alloys thereof and to apply thereto an electrically insulating coating of a refractory oxide such as alumina or zirconia. Such coatings are usually applied by electrophoretic deposition. In cases where good green strength prior to sintering has been desired, organic binders have been used and the oxide has been anaphoretically deposited; i.e., the object (such as a heater coil) to be coated is positively charged, at a few hundred to a few thousand volts. When a system utilizes organic binders, it is necessary to sinter the coatings in wet hydrogen to convert the carbon residues to volatile gases. However, these residuals are difficult to remove completely as subsequent layers of alumina and alumina salts tend to retard the diffusion of gaseous decomposition products through the coating. Additionally, to enhance the mobility of the electrolyte it is frequently necessary to add thereto "activators" comprised of low volatility, high molecular weight liquids. These are also difficult to remove during sintering. Furthermore, in most anaphoretic processes the variation in the amount of drag out and liquid codeposited with the alumina is poorly controlled. This results in poor control of coating density. Still further, rinsing of the coated coil is frequently required to wash off some of the codeposited liquid and to reduce bridging of the coating between turns of the coil.

The problem of density control is serious because if the coating coherence is poor, cracks will develop and ultimately the coating will chip off. This is particularly true in the case of heaters because of the cyclic heating and cooling they undergo in operation. If the porosity is too high, the tungsten or molybdenum heater wire will react at a greater rate with the usually undesirable atmosphere within the electron discharge device.

The anaphoretic method also requires the use of an anion to be adsorbed onto the surface of the particle to be moved. In those cases where nitrocellulose is used as a binder, the nitro groups serve this function. Other complex organic groups have also been used to enhance mobility, as well as simple inorganic anions such as sulfates and nitrates.

In all cases, the exposure of the tungsten or molybdenum heater wire core to potential surface oxidation is undesirable. This is equally true when exposing the wire core to the atmosphere of the organic decomposition products at the high temperatures used during sintering.

The sole advantage of the high voltage anaphoretic coating process lies in the low currents required for particle mobility at practical deposition rates and the use of solvents with higher flash points than is usually possible in low voltage anaphoretic methods.

Low voltage anaphoretic coating methods contain more anions and usually result in greater surface oxidation of the tungsten or molybdenum wire core. Further, such methods usually require a large quantity of electrolytes and consequently result in higher currents. Additionally, the high concentration of electrolytes usually means that more material is adsorbed, or retained, as a function of drag out from the bath upon removal of the coated object and from the co-deposited solution. As noted above, this is undesirable because of the hostile environment presented to the core during the decomposition of these salts which occurs during sintering.

Often, soluble salts are included in the coating formulations to enable the mismatch (i.e., the difference in expansion properties between the insulator coating and the core) to be overcome by reducing the coherent strength of the coating. However, this leads to uncontrolled cracks and chipping of the coating and can ultimately lead to heater failure. For this reason, the solution from which the deposition occurs should be low in salts of any kind.

OBJECTS AND SUMMARY OF THE INVENTION

It is, therefore, an object of this invention to obviate the disadvantages of the prior art.

It is another object of the invention to enhance the coating of metallic objects.

It is another object of the invention to provide a purified refractory oxide.

These objects are accomplished in one aspect of the invention by the provision of a method of purifying refractory oxides such as alumina or zirconia for use in electrophoretic deposition processes. The method comprising firing a quantity of the oxide in a muffle furnace for between about 14 and 16 hours at a temperature between about 1,050°C to 1,100°C. After cooling the oxide in a dessicator to between about 20° to 25°C it is repeatedly leached with hot deionized water until a rinse shows a pH of about 7.0 to 7.5. Then the oxide is dried at 105°C and stored in a dessicator.

This process removes water and alcohol soluble salts to the point where they are present at only a few parts per million and allows the use of a low-voltage, low-current cataphoretic process. The use of the cataphoretic process greatly reduces the surface oxidation of the heater core and permits high temperature sintering in a low dew point hydrogen atmosphere.

DESCRIPTION OF THE PREFERRED EMBODIMENTS

For a better understanding of the present invention, together with other and further objects, advantages and capabilities thereof, reference is made to the following disclosure and appended claims.

To purify a refractory oxide for use with a cataphoretic deposition process a quantity of electronic grade alumina or zirconia, equivalent in purity to Norton 38–900 alundum, is first fired at a temperature of about 1,050°C to 1,100°C in a muffle furnace for about 14 to 16 hours. After the firing the oxide is placed in a dessicator to avoid contamination (it is very sensitive to adsorption after this treatment) and is cooled to room temperature; i.e., to between about 20°C to 25°C. When the oxide has reached the required temperature it is repeatedly leached with separate rinses of hot, deionized water until a rinse shows a pH of about 7.0 to 7.5. Thereafter, the oxide is dried at 105°C and then stored in a dessicator with fresh dessicant until it is to be used. This process removes residual salts such as sulfate and sodium compounds which not only adversely effect the cataphoresis bath but also adversely effect finished heaters by contributing to heater-cathode leakage.

Typical formulations utilizing the purified oxides are as follows:

Example 1.
- 100 grams purified alumina
- 1 ml of 1% B-1 binder in isopropanol
- 349 ml anhydrous isopropanol Example 2.
- 100 grams purified zirconia
- 0.7 ml of 1% B-1 binder in isopropanol
- 159.3 ml anhydrous isopropanol Example 3.
- 100 grams purified alumina
- 100 ml of 2% aluminum salt of 2, 4 pentanedione in anhydrous methanol
- 100 ml anhydrous methanol
- 400 ml methyl ethyl ketone Example 4.
- 100 grams purified zirconia
- 1.2 grams zirconium salt of 2, 4 pentanedione
- 200 ml anhydrous methanol
- 200 ml methyl ethyl ketone Example 5.
- 100 grams purified alumina
- 1.2 grams zirconium salt of 2, 4 pentanedione
- 100 ml anhydrous methanol
- 300 ml anhydrous isopropanol NOTE: B-1 binder is essentially a basic aluminum nitrate. A description of the exact composition as well as methods of making the same can be found in U.S. Pat. No. 2,179,453.

In Example 1 the given concentration of binder would provide about 10 ppm of $Al^{+3}$ on a solids basis. In Example 2 the amount would be about 7 ppm of $Al^{+3}$. In Example 3 the aluminum salt of 2, 4 pentanedione would provide about 160 ppm on a solids basis. Example 3 also illustrates the use of a mixed solvent system which permits multiple dips without washing away previous coatings as the salt is only very slightly soluble in the methyl ethyl ketone.

In Examples 1, 2 and 5 methyl alcohol can be substituted for the isopropanol if the heater coil being coated does not have too many turns per inch. If the number of turns per inch is great then bridging will more likely occur with the methyl alcohol since the electrophoretic current will be higher and thus the amount of solvent co-deposited will be increased.

All of the above-referenced coating suspensions can be mixed in a high speed stirrer or in a ball mill jar and are immediately ready for use.

To be employed as a coating suspension the mixture selected is poured to the required depth in a stirred container suitable for electrophoretic deposition. A stainless steel or tantalum anode of proper configuration serves as the positive terminal in the system and the coil or other object to be coated is connected to the negative of the power supply. Obviously, the necessary time controlled switches, automated dip and transfer devices, etc. can be used as with other coatings so long as proper polarities are observed.

With only slight modifications in respect to solution concentrations, dilutions, etc. coatings of practical weights can be deposited in 2–10 seconds at voltages of 10–40 volts and current densities of 10–600 $\mu A/cm^2$.

It will be seen from the above that insulator coatings of refractory oxides can effectively be applied cataphoretically at low current and low voltage. The treated refractory oxides are low in the residual salts which can cause heater-cathode leakage. By using a known, controlled amount of electrolyte to provide the desired ion and particle mobility a more favorable environment is presented to the core during the thermal decomposition of those salts during sintering. Further, coating density can be better controlled to minimize cracking and peeling and bridging between turns of a coil is reduced.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a method of purifying a refractory oxide for use in an electrophoretic deposition process the steps comprising: firing said oxide in a muffle furnace for between 14 and 16 hours at a temperature between about 1,050° to 1,100°C; cooling said oxide to between about 20° to 25°C in a dessicator; leaching said oxide with repeated rinses of hot deionized water until a rinse shows a pH of about 7.0 to 7.5; drying said oxide at 105°C; and storing said oxide in a dessicator.

2. The invention of claim 1 wherein said refractory oxide is selected from the group consisting of alumina and zirconia.

3. The invention of claim 2 wherein said firing time is 15 hours.

4. The invention of claim 3 wherein said firing temperature is 1,075°C.

* * * * *